(12) United States Patent
Bassi et al.

(10) Patent No.: US 9,671,040 B2
(45) Date of Patent: Jun. 6, 2017

(54) CONTINUOUS MAGNETIC MOTION POSITION INDICATOR

(71) Applicant: PetrolValves S.R.L., Milan (IT)

(72) Inventors: Alessandro Bassi, Dubino (IT);
Michele Ambrosini, Dubino (IT);
Mario Gattere, Castronno (IT)

(73) Assignee: PetrolValves S.R.L., Milan (IT)

( * ) Notice: Subject to any disclaimer, the term of this patent is extended or adjusted under 35 U.S.C. 154(b) by 0 days.

(21) Appl. No.: 14/093,201

(22) Filed: Nov. 29, 2013

(65) Prior Publication Data

US 2014/0182686 A1 Jul. 3, 2014

Related U.S. Application Data

(60) Provisional application No. 61/732,230, filed on Nov. 30, 2012.

(51) Int. Cl.
*F16K 37/00* (2006.01)

(52) U.S. Cl.
CPC ...... *F16K 37/0033* (2013.01); *F16K 37/0008* (2013.01); *F16K 37/0025* (2013.01); *F16K 37/0041* (2013.01); *Y10T 137/0318* (2015.04); *Y10T 137/8242* (2015.04); *Y10T 137/8275* (2015.04)

(58) Field of Classification Search
CPC .......................... F16K 37/0033; F16K 37/0025
USPC .......... 137/553, 554, 527, 556; 324/200–263
See application file for complete search history.

(56) References Cited

U.S. PATENT DOCUMENTS

| | | | | |
|---|---|---|---|---|
| 3,347,262 A | * | 10/1967 | Gibson | F16K 31/088 137/375 |
| 3,747,892 A | * | 7/1973 | Gigantino | F16K 31/02 251/308 |
| 3,914,994 A | * | 10/1975 | Banner | G01F 1/28 137/554 |

(Continued)

FOREIGN PATENT DOCUMENTS

| | | |
|---|---|---|
| CN | 101059183 A | 10/2007 |
| DE | 8319999 | 10/1983 |
| JP | S61171979 A | 8/1986 |

OTHER PUBLICATIONS

International Search Report and Written Opinion of the International Searching Authority issued on Mar. 5, 2014, in connection with PCT/EP2013/075094.

(Continued)

*Primary Examiner* — Kevin Murphy
(74) *Attorney, Agent, or Firm* — Corridor Law Group, P.C.

(57) ABSTRACT

A continuous magnetic motion position indicator detects the position of a clapper valve. The clapper valve comprises a valve body and, disposed within the valve body, a clapper and a valve stem. The continuous magnetic motion position indicator comprises: (a) a magnetic joint assembly comprising a first set of magnets disposed inside the valve body and a second set of magnets located outside the valve body that operatively interface with the first set of magnets, and (b) a remote position transmitter and/or a local visual indicator. In operation, the magnetic joint assembly transmits rotary movement of the clapper from the valve stem to the remote position transmitter and/or local visual indicator, without the presence of a dynamic seal interface.

6 Claims, 9 Drawing Sheets

(56) References Cited

U.S. PATENT DOCUMENTS

| | | | | |
|---|---|---|---|---|
| 4,148,339 | A * | 4/1979 | Waltrip | 137/553 |
| 4,274,444 | A * | 6/1981 | Ruyak | 137/630.14 |
| 4,284,262 | A * | 8/1981 | Ruyak | 251/65 |
| 4,353,390 | A * | 10/1982 | Karpenko | F16K 15/03 |
| | | | | 137/527.8 |
| 4,384,703 | A * | 5/1983 | Ruyak et al. | 251/65 |
| 4,392,375 | A * | 7/1983 | Eguchi | F02D 11/106 |
| | | | | 137/554 |
| 4,574,836 | A * | 3/1986 | Barnard, Jr. | 137/553 |
| 4,777,979 | A * | 10/1988 | Twerdochlib | F16K 15/03 |
| | | | | 137/527.8 |
| 5,086,273 | A * | 2/1992 | Leon | G01B 7/14 |
| | | | | 116/277 |
| 5,140,263 | A * | 8/1992 | Leon | G01B 7/14 |
| | | | | 116/277 |
| 5,277,223 | A * | 1/1994 | Glockner | F16K 37/0008 |
| | | | | 137/315.35 |
| 5,342,025 | A | 8/1994 | Hwang | |
| 5,518,028 | A * | 5/1996 | Walker | F16K 37/0033 |
| | | | | 137/554 |
| 5,611,368 | A * | 3/1997 | Hwang et al. | 137/553 |
| 6,201,388 | B1 * | 3/2001 | Pecheny | G01D 5/145 |
| | | | | 324/207.2 |
| 6,213,147 | B1 * | 4/2001 | Gramann | F01L 9/04 |
| | | | | 123/90.11 |
| 7,461,670 | B1 * | 12/2008 | Roys | 137/554 |
| 2008/0296804 | A1 * | 12/2008 | Colli et al. | 264/274 |
| 2009/0126801 | A1 * | 5/2009 | Grill et al. | 137/78.3 |
| 2010/0084029 | A1 * | 4/2010 | Lin et al. | 137/553 |
| 2010/0199506 | A1 | 8/2010 | Moureaux et al. | |

OTHER PUBLICATIONS

Patent Examination Report No. 1 issued on Dec. 16, 2015, in connection with Australian Application 2013351120.
Chinese Office Action issued on Jul. 12, 2016 in connection with Chinese Patent Application No. 201380062631.X.
Korean Office Action issued on Jul. 20, 2016 in connection with Korean Patent Application No. 10-2015-7016919.
Korean Office Action issued on Jan. 19, 2017 in connection with Korean Patent Application No. 10-2015-7016919.
Chinese Office Action issued on Mar. 2, 2017 in connection with Chinese Patent Application No. 201380062631.X.

* cited by examiner

CONTINUOUS MAGNETIC MOTION POSITION INDICATOR

CROSS-REFERENCE TO RELATED APPLICATION

This application is related to and claims priority benefits from U.S. Provisional Patent Application Ser. No. 61/732,230 filed on Nov. 30, 2012, entitled "Continuous Magnetic Motion Position Indicator". The '230 provisional application is hereby incorporated by reference herein in its entirety.

FIELD OF THE INVENTION

The present invention relates to subsea and top side check valves. In particular, the present invention relates a continuous magnetic motion position indicator device capable of providing a continuous indication of a valve clapper's instantaneous position.

BACKGROUND OF THE INVENTION

In designs of conventional, prior art check valves, the position of the clapper is generally not detectable without introducing a leak path in the valve body. The only position that can be detected is the locked open position, as this is usually detectable by means of an external device located on the operator located outside the valve body. The operator is the mechanical or hydraulic equipment used to actuate the valve. When the clapper in conventional check valves is in free swinging motion, however, the actual position of the clapper is not detectable.

Knowing the actual position of the clapper can be of crucial importance to ensure correct functioning of the check valve itself and the plant. The plant is the production system, which includes but is not limited to the pipeline assembly. Moreover, monitoring the position of the clapper can permit the anticipation and correction of potential failures associated with the valve, thereby preventing or reducing the adverse consequences of such failures on the entire plant.

The present, improved Continuous Magnetic Motion Position Indicator (CMMPI) comprises a magnetic joint assembly and a remote position transmitter and/or local visual indicator which can be in single or multiple forms. The magnetic joint transmits rotary movement of the clapper from the valve's clapper stem (inside the valve body) to the position indicator stem (outside the valve body), without the presence of dynamic seal interface(s).

The rotation of the valve stem is transferred to the remote rotary position transmitter, which converts the rotary movement of the clapper to a current signal for remote monitoring. A visual local position indicator can also be included in the design.

In the present, improved CMMPI, the magnetic joint comprises a set of magnets inside the valve body that interfaces with another set of magnets located outside the valve body. Proper orientation of the magnetic fields and the location of the magnets, as well as the selection of materials for the components involved, provide for reliable and durable operation of the joint assembly.

One type of magnet that can be employed in the present CMMPI is a permanent magnet. Orientation of the magnets is alternatively North-South-North-South. The external set is opposite in polarity to the internal set.

Components for the present CMMPI can be selected to be resistant to the process fluid and to sea water. In addition, material selection should account for the ferromagnetic properties of the materials employed to alleviate potential interference with the magnetic fields.

The present CMMPI system can be fitted with various types of remote rotary transmitters, and the number of transmitters can vary depending on the level of redundancy required or desired.

SUMMARY OF THE INVENTION

In one embodiment, a continuous magnetic motion position indicator detects the position of a clapper valve comprising a valve body and, disposed within the valve body, a clapper and a valve stem. The indicator comprises:
 (a) a magnetic joint assembly comprising a first set of magnets disposed inside the valve body and a second set of magnets located outside the valve body that operatively interface with the first set of magnets; and
 (b) at least one remote position transmitter.

In operation, the magnetic joint assembly transmits rotary movement of the clapper from the valve stem to remote position transmitter without the presence of a dynamic seal interface.

The foregoing continuous magnetic motion position indicator can further comprise a gear assembly for transmitting rotary motion from the second set of magnets to the remote position transmitter. The at least one remote position transmitter can include a plurality of remote position transmitters.

In another embodiment, a continuous magnetic motion position indicator that detects the position of a clapper valve comprising a valve body and, disposed within the valve body, a clapper and a valve stem, comprises:
 (a) a magnetic joint assembly comprising a first set of magnets disposed inside the valve body and a second set of magnets located outside the valve body that operatively interface with the first set of magnets; and
 (b) at least one local visual indicator.

In operation, the magnetic joint assembly transmits rotary movement of the clapper from the valve stem to the at least one local visual indicator, without the presence of a dynamic seal interface.

The foregoing continuous magnetic motion position indicator can further comprises a gear assembly for transmitting rotary motion from the second set of magnets to the local visual indicator. The at least one local visual indicator can include a plurality of local visual indicators.

A first embodiment of a method of detecting the position of a clapper valve comprises a valve body and, disposed within the valve body, a clapper and a valve stem. The first method embodiment comprises:
 (a) disposing a first set of magnets inside the valve body and a second set of magnets outside the valve body that operatively interface with the first set of magnets to form a magnetic joint assembly; and
 (b) transmitting rotary movement of the clapper from the valve stem to at least one remote position transmitter operatively connected to the second set of magnets.

In performing the first method embodiment, the clapper rotary movement is transmitted to the at least one remote position transmitter without the presence of dynamic seal interface.

In a second embodiment, a method of detecting the position of a clapper valve comprising a valve body and, disposed within the valve body, a clapper and a valve stem, the method comprising:
 (a) disposing a first set of magnets inside the valve body and a second set of magnets outside the valve body that operatively interface with the first set of magnets to form a magnetic joint assembly; and (b) transmitting rotary movement of the clapper from the valve stem to at least one local visual indicator operatively connected to the second set of magnets.

In performing the second method embodiment, rotary movement of the clapper is transmitted to the local visual indicator without the presence of dynamic seal interface.

DETAILED DESCRIPTION OF PREFERRED EMBODIMENT(S)

Figure 1:
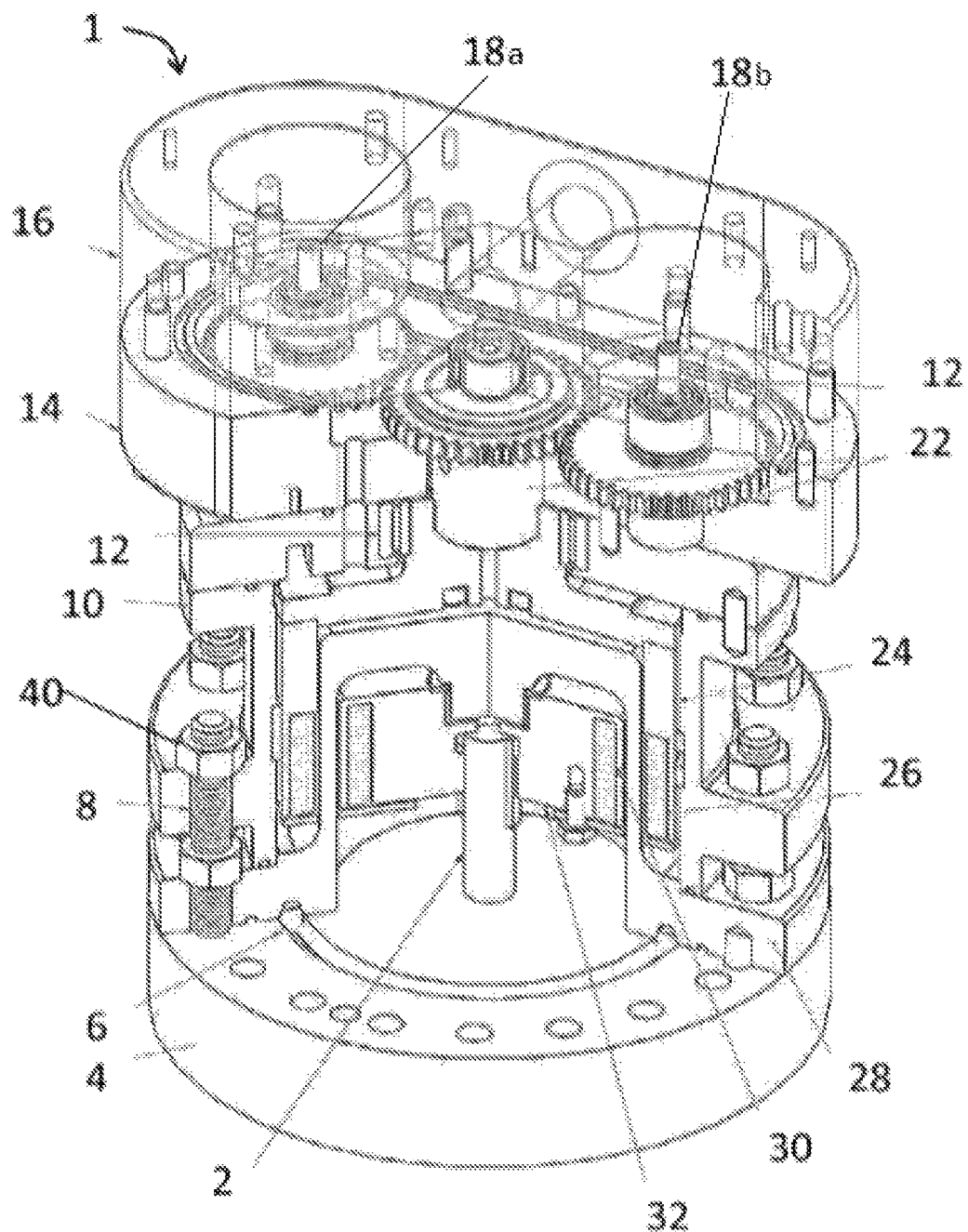
FIG. 1 is a perspective cutaway sectional view of the present Continuous Magnetic Motion Position Indicator (CMMPI).

FIG. 1 shows a continuous magnetic motion position indicator (CMMPI) 1 for subsea and topside applications. CMMPI 1 enables the monitoring of the instantaneous position of the clapper through valve shaft 2, including free-swinging motion.

As further shown in FIG. 1, CMMPI 1 includes a housing 10 connected to pressure-containing cap 28 and valve body 4 using fixing bolts 8 and nuts 40. External magnet set 26 is contained in an external magnet housing 24 and internal magnet set 30 is contained in an internal magnet housing 32. External and internal magnet sets 26 and 30, respectively, transfer the rotation of the clapper through valve shaft 2 to a local visual indicator 18a and/or remote position transmitter 18b outside the pressure-containing parts and contained in cover 16. The position of the clapper can thereby be detected without introduction additional dynamic seal interfaces in valve body 4 and instead allows valve body 4 to utilize a static seal 6. The transfer of motion from the magnetic sets 26 and 30 to a local visual indicator 18a and/or remote position transmitter 18b is accomplished by way of gear sets 22, which are located in gear sets housing 14.

Figure 2:
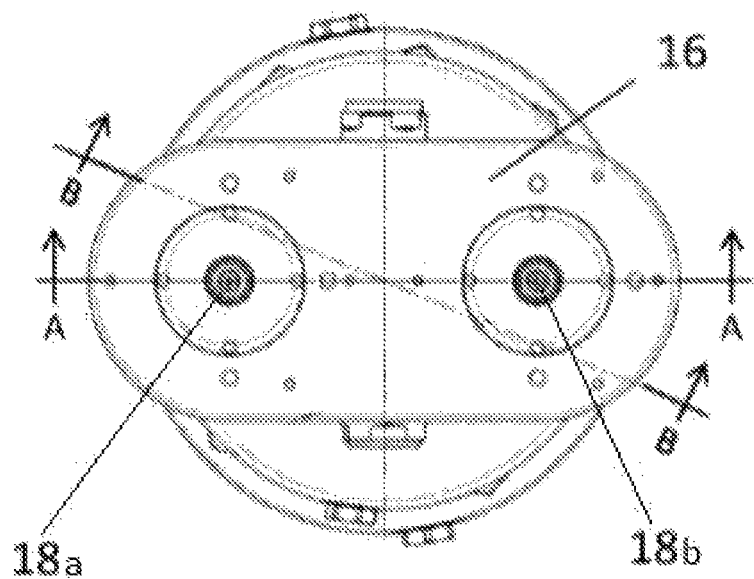
FIG. 2 is a top view of the CMMPI illustrated in FIG. 1.

FIG. 2 is a top view of CMMPI 1 showing cover 16, as well as local visual indicator 18a and/or remote position transmitter 18b. Arrows A-A identify the bisecting line for the cross-sectional view illustrated in FIG. 3. Arrows B-B identify the bisecting line for the cross-sectional illustrated in FIG. 4.

Figure 3:
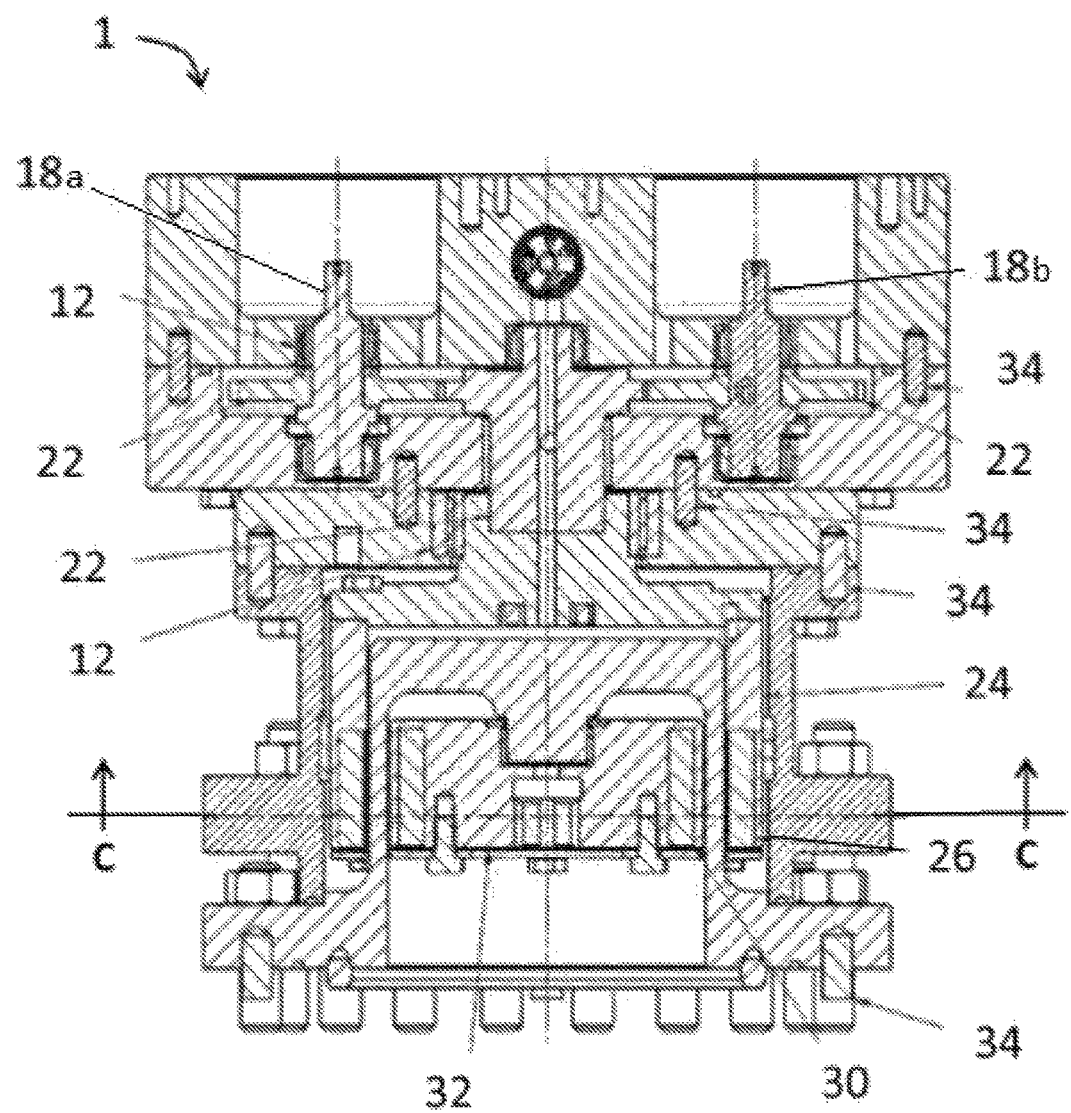
FIG. 3 is cross-sectional view of the present CMMPI, taken in the direction of arrows A-A in FIG. 2.
Figure 4:
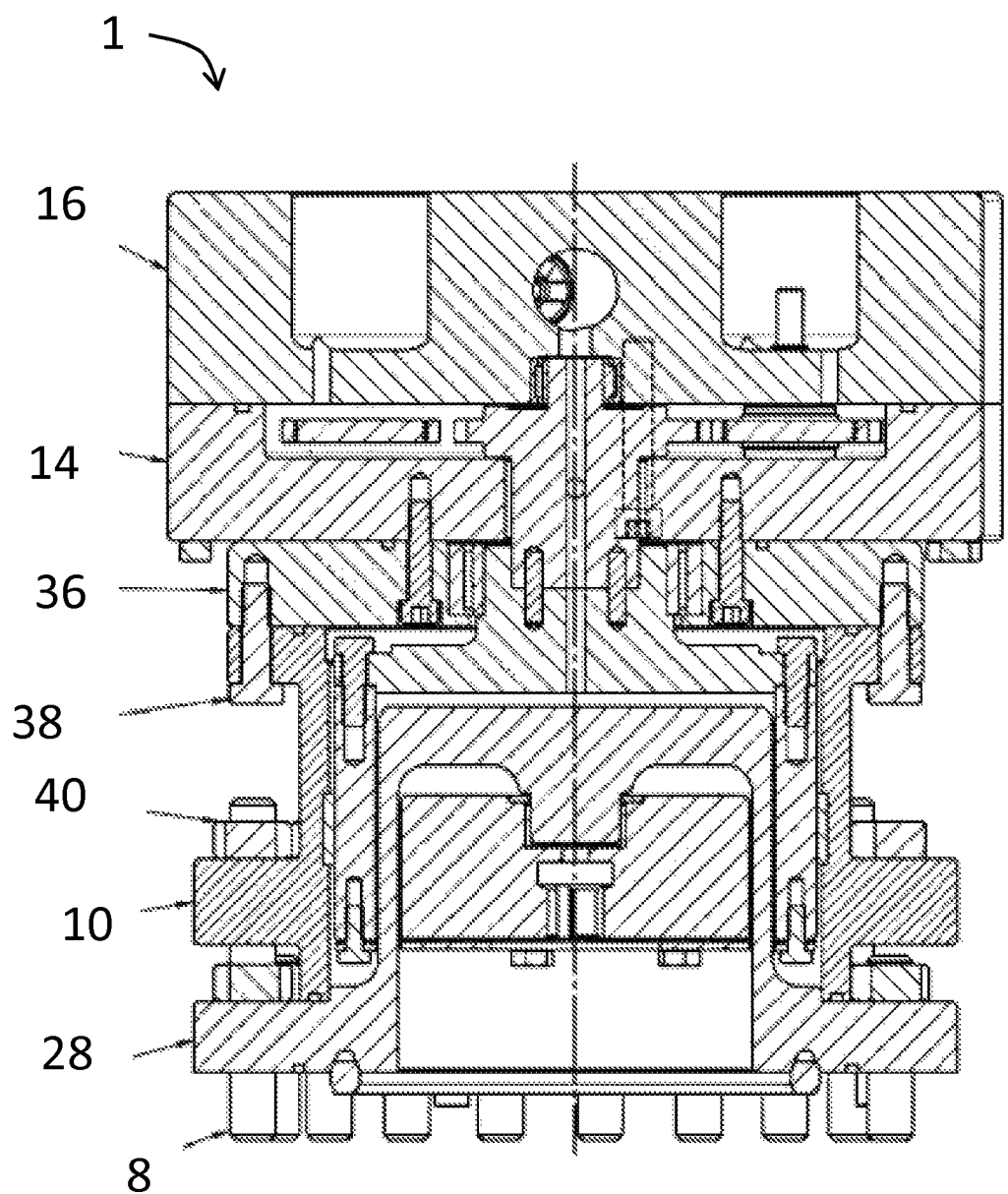
FIG. 4. is cross-sectional view of the present CMMPI, taken in the direction of arrows B-B in FIG. 2.

FIG. 3 shows a cross-sectional views of CMMPI 1, taken in the direction of arrows A-A in FIG. 2. FIG. 4 shows a cross-sectional views of CMMPI 1, taken in the direction of arrows B-B in FIG. 2. FIGS. 3 and 4 specifically illustrate the connections among the various components of CMMPI 1. Roller bearings 12 are utilized throughout the CMMPI 1 to facilitate movement, while pins 34 facilitate the attachment of cover 16 to gear set housing 14. Pins 34 also facilitate the attachment of gear set housing 14 to housing 10, as well as the attachment of pressure-containing cap 28 to valve body 4 (see FIG. 1). Bolts 8 and nuts 40 facilitate the attachment of housing 10 to pressure-containing cap 28 and valve body 4. FIG. 4 also shows flange 36 and hexagonal screw 38.

Figure 5:
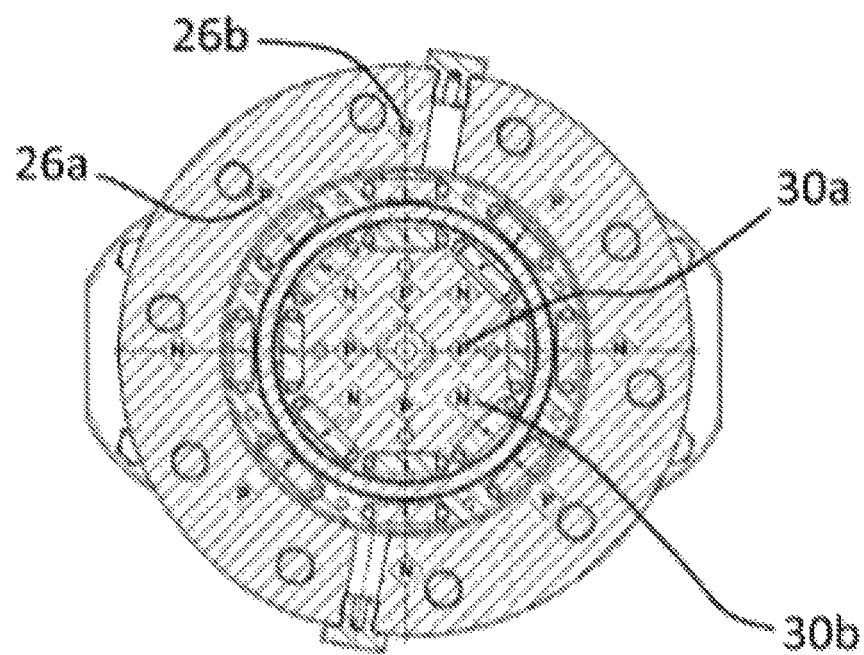
FIG. 5 is a cross-sectional view of the present CMMPI, taken in the direction of arrows C-C in FIG. 3.

FIG. 5 is a cross-sectional view of the present CMMPI, taken in the direction of arrows C-C in FIG. 3. FIG. 5 illustrates the placement of internal magnet set 30 and external magnet set 26. The eight internal magnets 30 are arranged alternatingly, with an internal magnet with the positive pole facing down depicted in FIG. 5 as internal magnet 30a and an internal magnet with the negative pole facing down depicted as internal magnet 30b. Similarly, the eight external magnets 26 are arranged alternatingly, with an external magnet with the positive pole facing down depicted in FIG. 5 as external magnet 26a and an external magnet with the negative pole facing down depicted as external magnet 26b.

Figure 6:
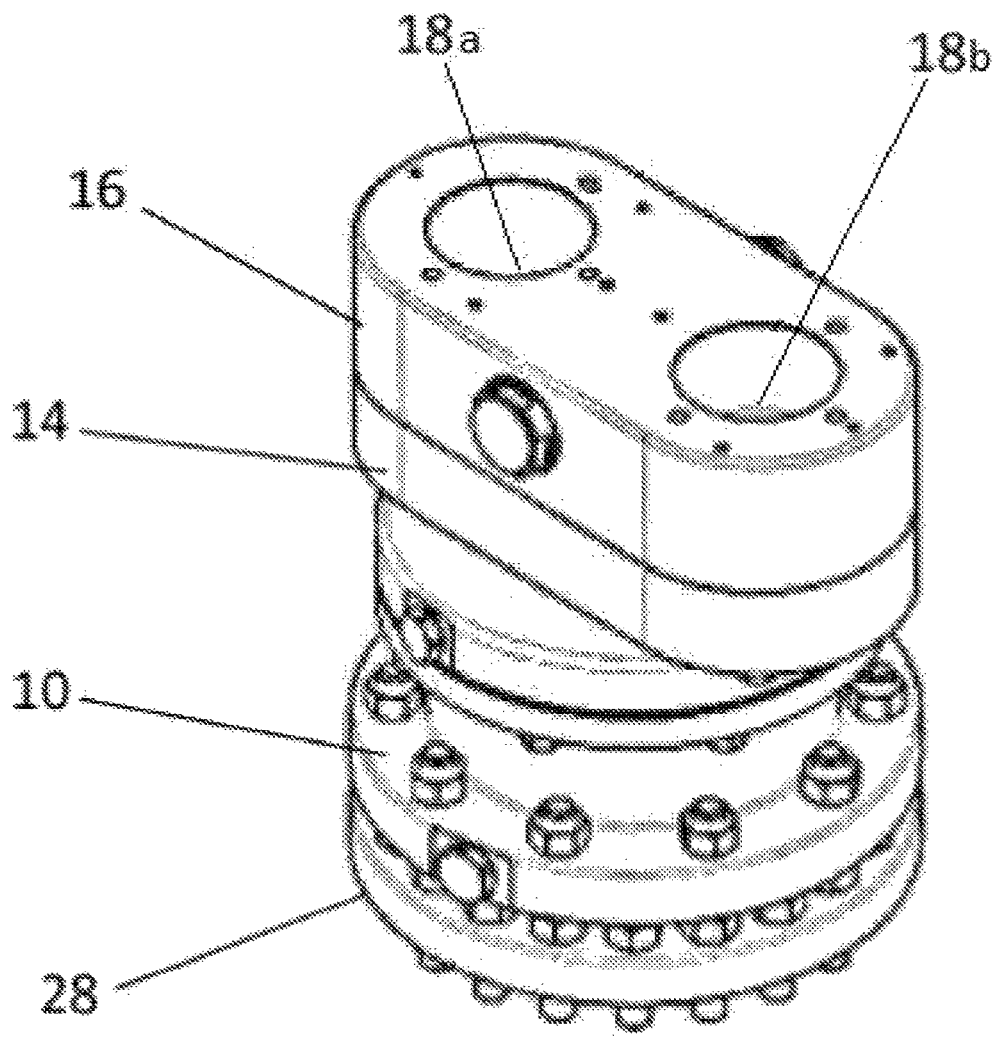
FIG. 6 is a perspective view of the present CMMPI.

FIG. 6 is a perspective view of the CMMPI 1 showing local visual indicator 18a and/or remote position transmitter 18b, gear set housing 14, housing 10, and pressure-containing cap 28.

Figure 7:
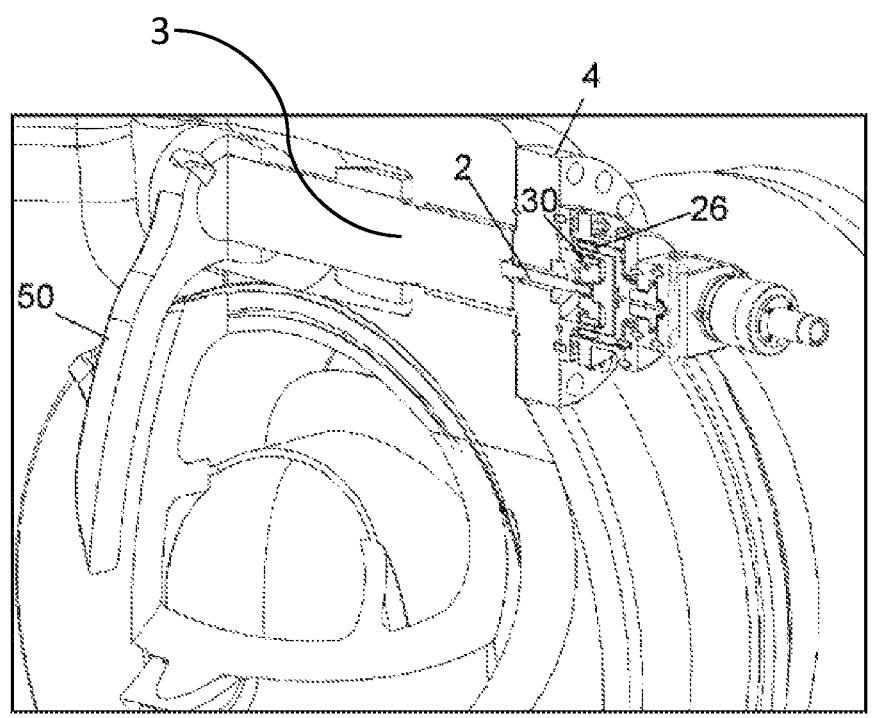
FIG. 7 is a perspective cutaway sectional view of the CMMPI of FIG. 1 showing the shaft connected to the clapper.

FIG. 7 illustrates shaft 2 of CMMPI 1 connected to clapper 50. CCMPI 1 is configured to be used with non-returning valves such as swing check valves, tilting valves and dual-plate valves. Non-returning valves are composed of a rotating stein where clapper 50 (often referred to as an obturator) is pivotally mounted to valve body via a shaft/hinge pin and its shaft housing. CCMPI 1 transfers the motion of clapper 50 through the shaft/hinge pin outside the pressure boundary.

Figure 8:
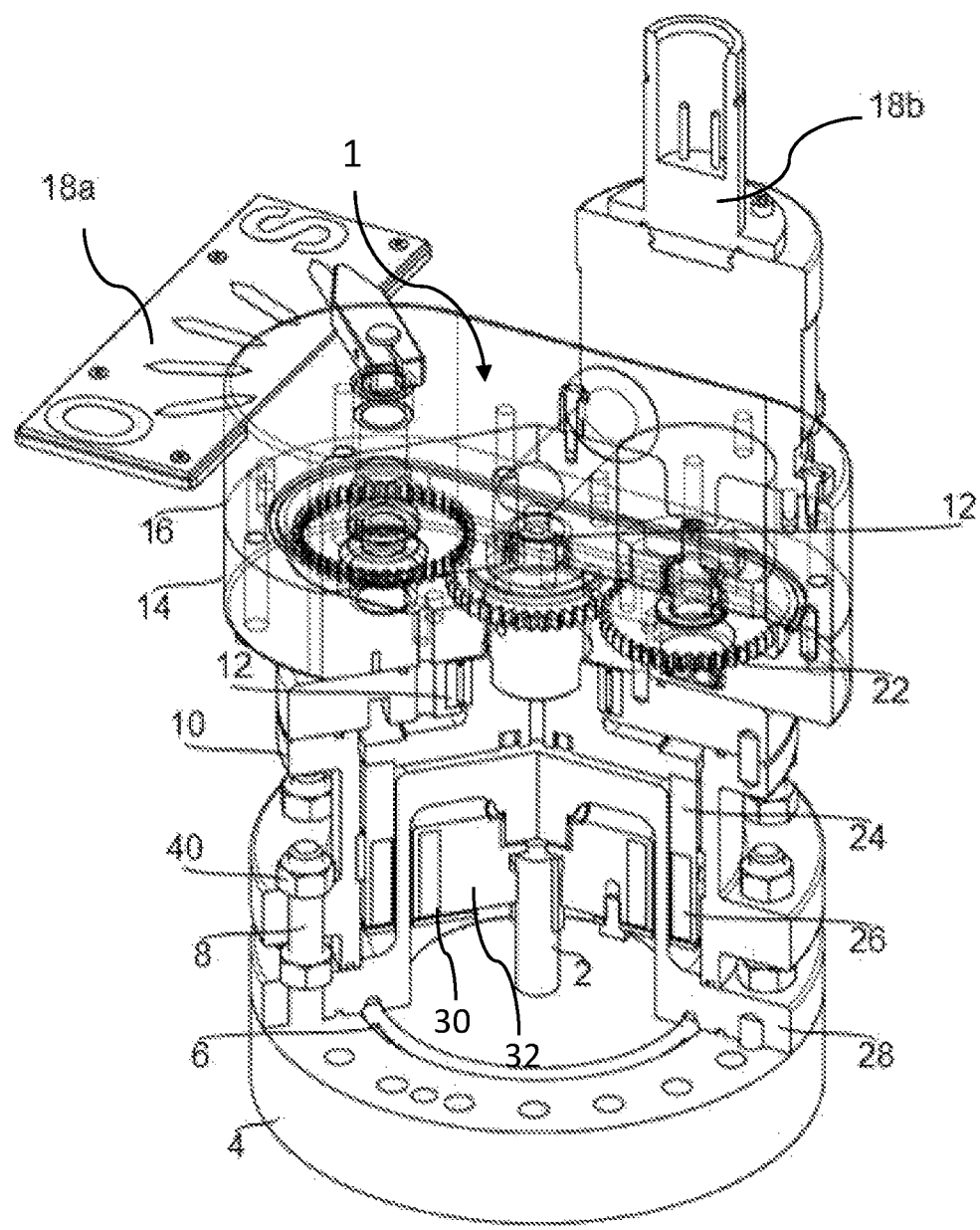
FIG. 8 is a perspective cutaway view of a CMMPI in some embodiments showing a visually enhanced local visual indicator and a remote position indicator.

FIG. 8 illustrates a CMMPI having local visual indicator 18a and remote position transmitter 18b in an embodiment where large indicators and transmitters are desired for easy reading and maintenance.

Figure 9:
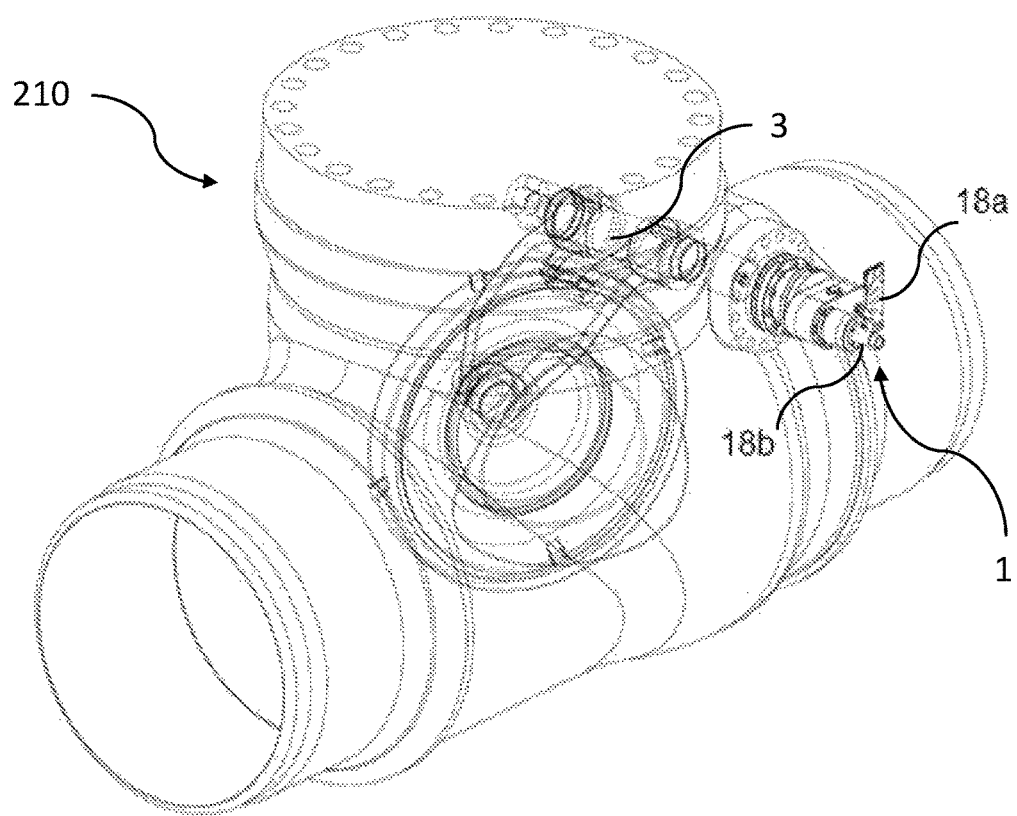
FIG. 9 is a perspective view of a CMMPI and clapper valve in some embodiments.

FIG. 9 illustrates a CMMPI keyed to clapper valve 210 (generally indicated) via valve shaft 2 interacting with clapper valve stem 3.

Figure 10:
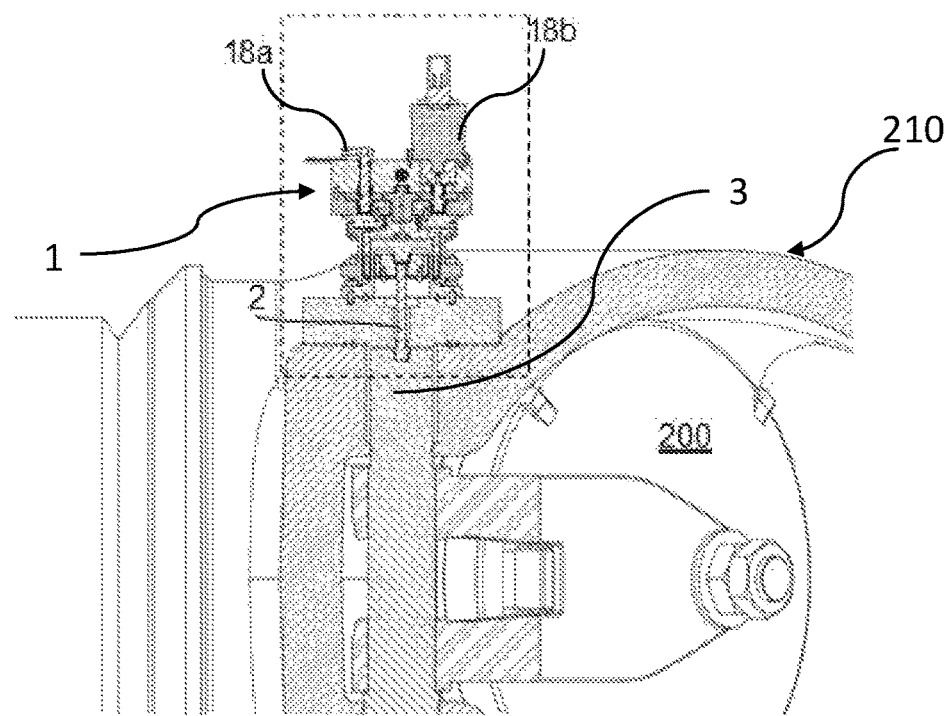
FIG. 10 is a perspective cutaway view of a CMMPI and a clapper valve in some embodiments.

FIG. 10 illustrates a CMMPI keyed to a clapper valve 210 via valve shaft 2 interacting with clapper valve stem 3, further showing clapper valve stem 3 connected to clapper 200 comprising clapper valve 210.

Figure 11:
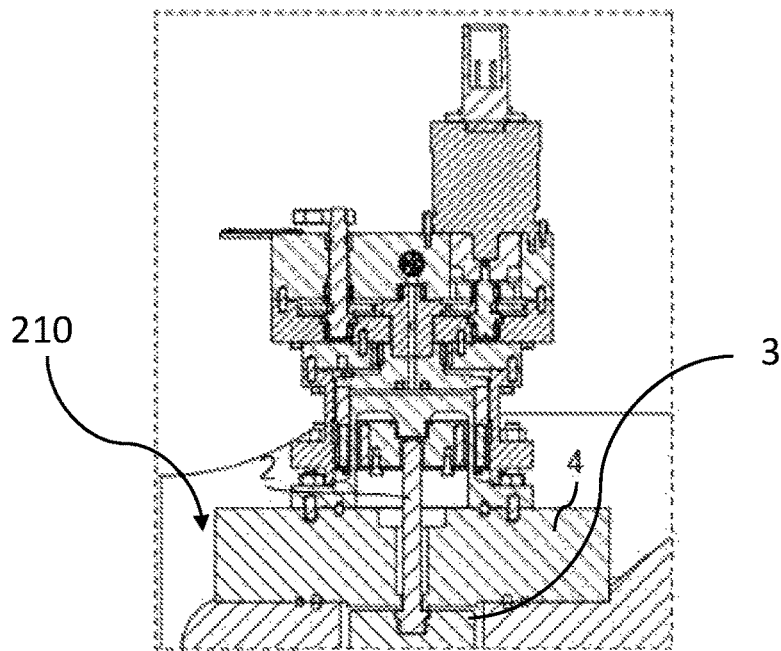
FIG. 11 is a perspective cutaway view of a CMMPI and a clapper valve in some embodiments.

FIG. 11 illustrates a CMMPI connection between valve shaft 2 and clapper valve stem 3, wherein the CMMPI is affixed to valve body 4 of generally indicated clapper valve 210.

The present continuous position indicator has the following advantageous features:

(a) the present CMMPI allows the monitoring of the instantaneous position of the clapper in various positions, including the free swinging motion;

(b) the present CMMPI can be implemented in top side and subsea valve applications;

(c) the present CMMPI does not include dynamic sealing interface(s), which could introduce potential leakage paths through the valve body;

(d) in the present CMMPI, the position transmitters and the external set of magnets can be readily removed and replaced from the outside of the valve body without detrimentally affecting the functioning of the valve.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A subsea clapper-valve indicator system comprising:
    (a) a clapper valve comprising:
        (i) a valve body with a static seal;
        (ii) a clapper; and
        (iii) a clapper valve stem keyed to said clapper;
    (b) a continuous magnetic motion position indicator configured for detecting the instantaneous position of said clapper comprising:
        (i) a magnetic joint assembly comprising a first set of magnets disposed inside a pressure containing cap affixed to said valve body, said first set of magnets being contained in an internal magnet housing, and a second set of magnets contained in an external magnet housing, located outside said pressure containing cap, said second set of magnets operatively interfacing with said first set of magnets, wherein said internal magnet housing is keyed on a valve shaft, and said valve shaft interacts with said clapper valve stem;
        (ii) a gear set comprising:
            (1) a first gear keyed on the top of said external magnet housing,
            (2) a second gear meshing with said first gear; and
            (3) a third gear meshing with said first gear;
        (iii) a remote position transmitter, said remote position transmitter being keyed on said second gear, whereby said magnetic joint assembly transmits rotary movement of said clapper to said remote position transmitter;
        (iv) a local visual indicator, said local visual indicator being keyed on said third gear, whereby said magnetic joint assembly transmits rotary movement of said clapper to said local visual indicator.

2. The system of claim 1 wherein said first set of magnets are permanent magnets.

3. The system of claim 1 wherein said first set of magnets includes eight magnets.

4. The system of claim 1 wherein said first set of magnets are arranged in an alternating pattern.

5. The system of claim 1 wherein said second set of magnets and said remote position transmitter can be removed from said continuous magnetic motion position indicator without affecting the functionality of said valve body.

6. A method of detecting the position of a clapper in a clapper valve in a subsea environment, wherein said clapper valve comprises a valve body with a static seal and, disposed within said valve body, a clapper keyed on a clapper valve stem, said method comprising:
    (a) disposing a first set of magnets contained in an internal magnet housing inside a pressure containing cap affixed to said valve body and a second set of magnets outside said pressure containing cap affixed to said valve body that operatively interface with said first set of magnets to form a magnetic joint assembly, wherein said internal magnet housing is keyed on a valve shaft interacting with said clapper valve stem and wherein said second set of magnets is contained in an external magnet housing;
    (b) disposing a gear set comprising a first gear on the top of said external magnet housing, a second gear meshing with said first gear, and a third gear meshing with said first gear;
    (c) placing a remote position transmitter such that said remote position transmitter indicator is keyed on said second gear;
    (d) transmitting rotary movement of said clapper to said remote position transmitter through said first and second set of magnets and said gear set;
    (e) placing a local visual indicator such that said local visual indicator being keyed on said third gear; and
    (f) transmitting rotary movement of said clapper to said local visual indicator—through said first and second set of magnets and said gear set.

* * * * *